United States Patent [19]
Curulla et al.

[11] 3,878,042
[45] Apr. 15, 1975

[54] SPRING AND STOP ASSEMBLY FOR NUCLEAR FUEL BUNDLE

[75] Inventors: Michael V. Curulla; Bart A. Smith; John A. Ashton, all of San Jose, Calif.

[73] Assignee: General Electric Company, San Jose, Calif.

[22] Filed: Sept. 12, 1973

[21] Appl. No.: 396,491

[52] U.S. Cl. ............... 176/78; 85/1 K; 151/21 C; 176/81; 403/12; 403/21; 403/242
[51] Int. Cl. ............................................. G21c 3/32
[58] Field of Search ............ 176/76, 78, 81; 85/1 K; 403/12, 21, 242; 151/21 C, 22

[56] References Cited
UNITED STATES PATENTS

| | | | |
|---|---|---|---|
| 3,775,249 | 11/1973 | Clapham | 176/78 |
| R27,173 | 9/1971 | Lass et al. | 176/98 |

Primary Examiner—Harvey E. Behrend
Attorney, Agent, or Firm—Ivor J. James, Jr.; Samuel E. Turner; Sam E. Laub

[57] ABSTRACT

A removable spring and stop assembly for use with a nuclear fuel bundle in a nuclear reactor core, said assembly including a bolt threaded through a top section of a stop member by which said assembly (and a flow channel) is secured to the fuel bundle, the adjacent end threads of the bolt and the stop member being upset or deformed by which the bolt is captured in the assembly.

5 Claims, 3 Drawing Figures

SPRING AND STOP ASSEMBLY FOR NUCLEAR FUEL BUNDLE

BACKGROUND

In a known type of nuclear power reactor the nuclear fuel is contained in a plurality of elongated fuel elements or rods which are grouped together and contained in open-ended tubular flow channels to form separately removable fuel assemblies or bundles. A sufficient number of such fuel bundles are arranged in a matrix to form the nuclear reactor core capable of self-sustained fission reaction. The core is submersed in a fluid, such as light water, which is circulated through the core and which serves both as a coolant and as a neutron moderator.

In a known core arrangement, such as shown in U.S. Pat. No. Re. 27,173, the core support arrangement includes an upper core or top grid structure comprising a plurality of crosslaced members or beams forming a plurality of cells or cubicles and each such cubicle accommodates four of the fuel bundles (as shown in FIGS. 2–4 of the above-mentioned U.S. Pat. No. Re. 27,173). The four fuel bundles are positioned in respective corners of the cubicle with spaces therebetween to provide a channel for receiving a cruciform shaped control rod.

Because of nuclear physics considerations and to prevent interference with insertion and withdrawal of the control rods, it is important that the four fuel bundles firmly be held in their respective corners of the cubicle. It is, however, desirable that the fuel bundles be held by resilient means to provide ease of inserting into and removing the fuel bundles from the core and to allow thermal and vibration induced movement of the fuel bundles.

To thus provide this resilient positioning and restraint of the fuel bundles, each is fitted with a spring and stop assembly at its upper corner which is adjacent the center of the cubicle. The springs of this spring and stop assembly extend along the two adjacent sides of the fuel bundle. Thus the springs of the assemblies on the adjacent bundles bear against one another to thereby restrain the fuel bundles in their corner positions.

The spring and stop assembly is attached to the fuel bundle by a removable steel retaining bolt which passes through a hole in a top section of the spring member, through a hole in a top section of the stop member, through a hole in a corner member of the fuel bundle flow channel and into a threaded hole in an extension of the upper tie plate of the fuel bundle. Thus this same bolt additionally secures the removable flow channel to the fuel bundle. The flow channel is made removable to allow inspection of the fuel rods and for reuse on a new fuel bundle.

After the flow channel has been used with a fuel bundle in an operating core, it becomes radioactive and must be removed and reinstalled by remotely operated tools under a layer of shield water, either in the reactor vessel or in a fuel pool. Because of this necessity for remote removal and installation, means are required for retaining or capturing the stop and spring members on the bolt. Prior means for thus retaining the stop and spring members on the bolt consisted of a spring retaining ring fitted in a groove in the shank of the bolt whereby the spring and stop members were captured between such retaining ring and the enlarged bolt head. Such a retaining ring is necessarily of relatively small size and, for use in the atmosphere of the nuclear reactor core, it is difficult to find a spring material of sufficient strength and corrosion resistance which also has the resilient characteristics necessary for a retaining ring. Retainer rings that have been used were found sensitive to improper assembly techniques. For example, if a retainer ring is over-expanded, while installing it in its groove, it can take a permanent set with a larger than original free diameter and it, therefore, will not fit tightly in the groove. This creates a possibility that the parts will drop off the bolt when it is later unfastened from the fuel bundle. This is a highly undesirable possibility since it would be difficult and costly to recover such dropped parts particularly from wherever such parts might lodge if dropped into the reactor core.

SUMMARY

It is, therefore an object of the invention to provide a simple reliable means for retaining the parts of a spring and stop assembly together.

This and other objects are achieved according to the invention by a headed retaining bolt having a threaded end portion and having a shank portion of reduced diameter between the threaded end portion and the bolt head. This retaining bolt is inserted through a clearance hole in the top section of the spring member and through a threaded hole in the top section of the stop member so that the threaded end bolt is clear of the threaded hole in the stop member. The adjacent end threads on the bolt and in the stop member are then upset so that the bolt cannot be removed whereby the spring member and the stop member are captured on the bolt shank. This eliminates the retaining ring, and the problems attendant therewith, of the prior art arrangement.

The mutual upsetting of the adjacent threads on the retaining bolt and stop member is acoomplished in accordance with the invention by applying tension between the bolt and stop member, thus causing the end threads of these elements to bear heavily against one another. Simultaneously, the bolt and the stop member are rotated with respect to one another in a direction opposite to the direction required to engage the threads. The result is a smooth, rounded upsetting of the end threads which prevents subsequent engagement of the threads and disassembly of the spring and stop assembly. By thus upsetting the threads on both the bolt and stop member smooth contacting surfaces are provided which eliminates the possibility of snagging or catching as might occur if the end thread on only the bolt or in only the stop member was upset for capture purposes.

DRAWING

The invention is described more specifically hereinafter with reference to the accompanying drawing wherein.

DESCRIPTION

Reference is made to the previously mentioned U.S.

Pat. No. Re. 27,173 for details of a fuel bundle and for a detailed description of the purpose and function of the spring and stop assembly. See FIGS. 5 and 6 of that patent in particular.

Figure 1:
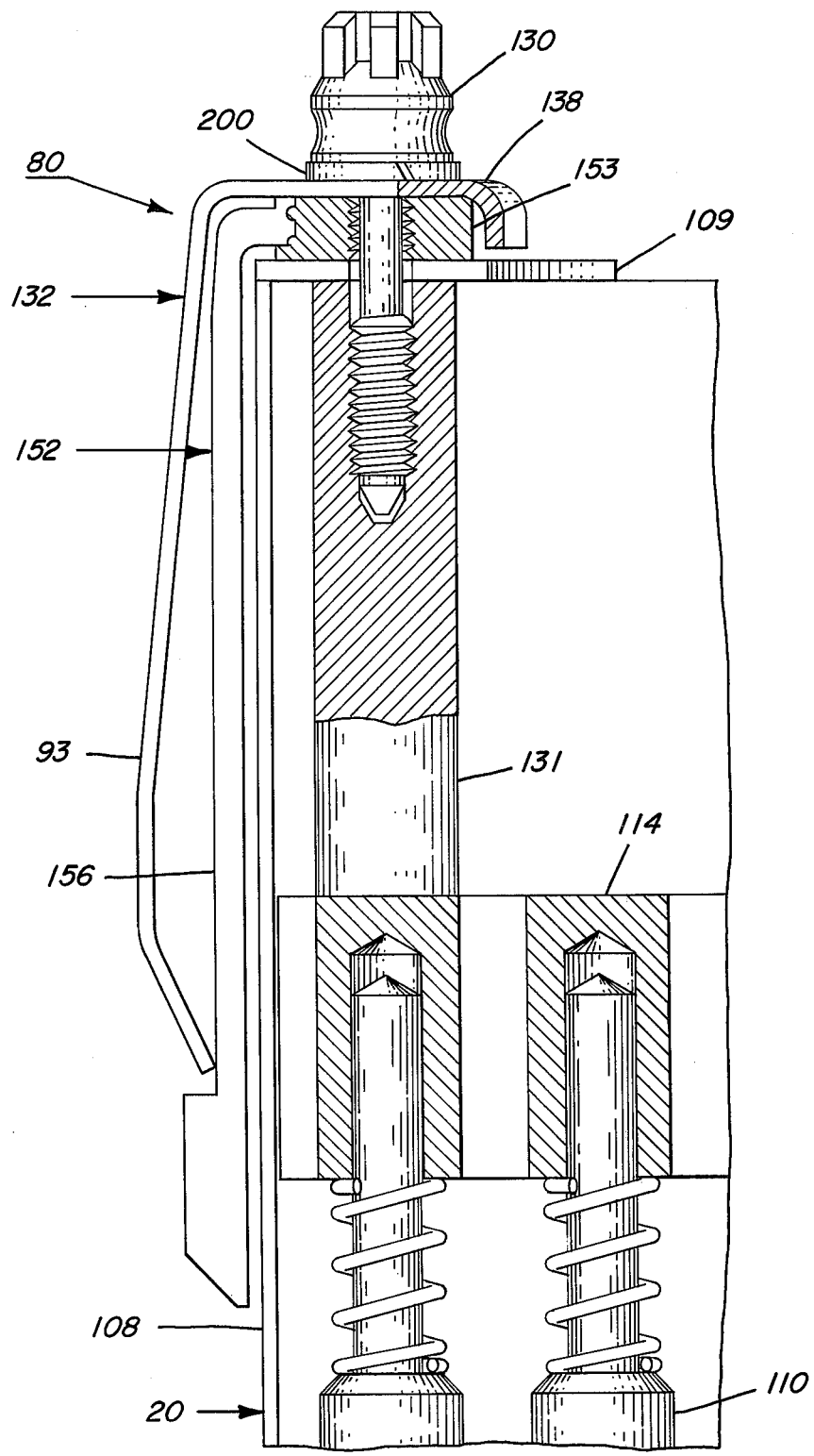
FIG. 1 is a longitudinal cross section view (partly cut away) of a top corner of a fuel bundle.

Only so much of the upper corner of a fuel bundle as is necessary for an understanding of the present invention is illustrated in FIG. 1 and the reference numbers used in the abovementioned patent are used for the similar parts.

As illustrated in FIG. 1, a fuel bundle 20 comprises a plurality of sheathed rods 110 containing nuclear fuel. The fuel rods 110 are held in a spaced array between an upper tie plate 114 and a lower tie plate (not shown herein). This assembly of fuel rods 110 is surrounded by a removable open-ended tubular flow channel 108 the purpose of which is to direct a flow of coolant through the fuel bundle. Secured to an upper corner of the flow channel 108 is a lateral corner member or strip 109 which rests upon a post or extension 131 of the upper tie plate 114. The corner member 109 is formed with a hole for receiving a retaining bolt 130 of a spring and stop assembly 80. The bolt 130 is threaded into a threaded hole in the extension 131 by which the flow channel 108, as well as the spring and stop assembly 80, is removably secured to the fuel bundle 20.

In addition to the retaining bolt 130, the spring and stop assembly 80 includes a lock washer 200, a spring assembly or member 132 and a stop or spring backing member 152. The stop member includes a top section 153 and a pair of elongated side sections, such as side section 156, extending downward along adjacent sides of the corner of the flow channel 108. The spring member 132 includes a top section 138 and a pair of spring leaf members, such a spring leaf member 93, overlaying the respective side sections of the stop member 152. (The spring and stop assembly 80 is shown in greater detail in FIG. 6 of the above-mentioned U.S. Pat. No. Re. 27,173.)

As mentioned hereinbefore, because the spring and stop assembly 80 must be removed from the fuel bundle 20 by remotely operated tools, it is necessary that the lock washer 200, the stop member 152 and the spring member 132 be captured on the retaining bolt 130.

Figure 2:
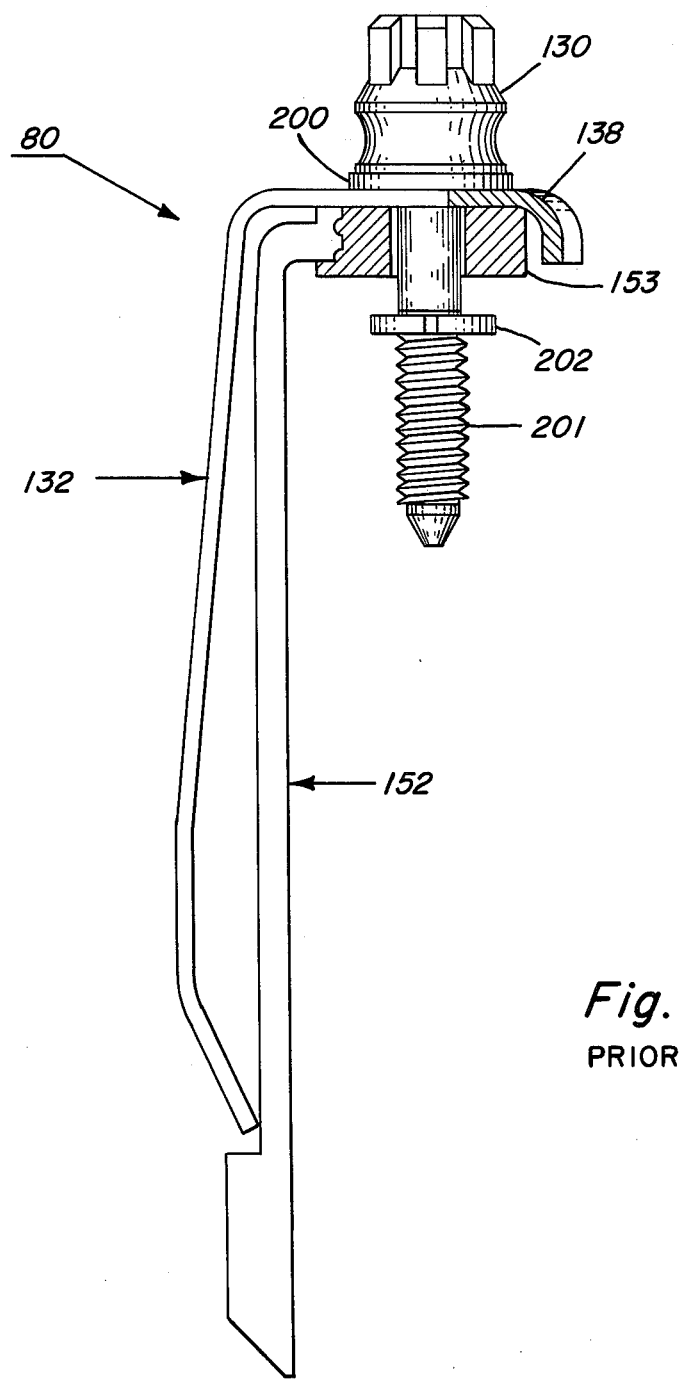
FIG. 2 is an elevation view (partly in section) of a prior art spring and stop assembly.

The prior art means for capturing or retaining the spring and stop members on the bolt 130 is illustrated in FIG. 2. In this prior art form, the top sections 138 and 153 of the spring and stop members, respectively, were formed with clearance holes for the bolt 130. Adjacent the threaded end portion 201 of the bolt 130, the shank of the bolt was formed with a groove for receiving a split spring clip or retaining ring 202. As explained hereinbefore, this prior arrangement has been found undesirable because of possible failure of the retaining ring 202.

Figure 3:
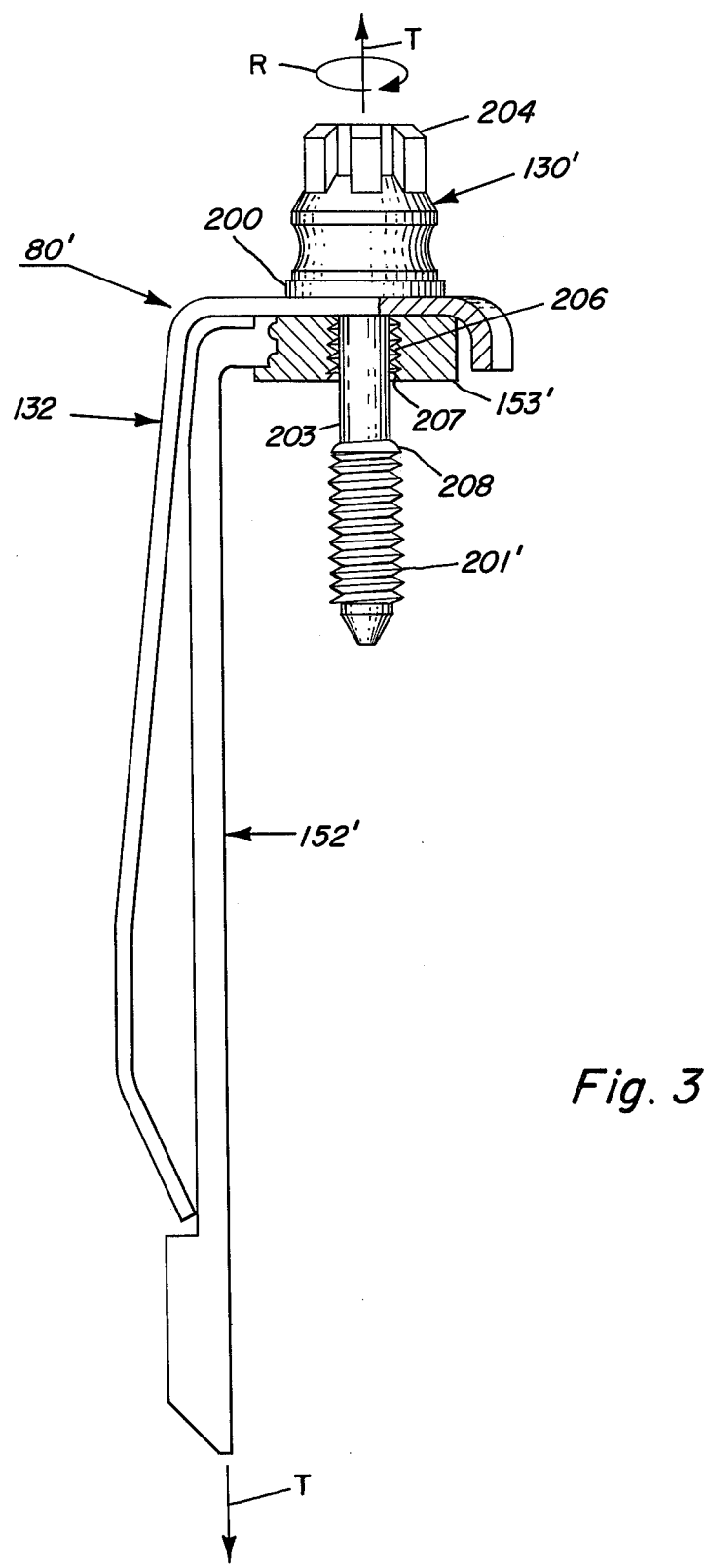
FIG. 3 is an elevation view (partly in section) of a spring and stop assembly according to the invention.

The simplified spring and stop arrangement of greatly increased reliability according to the present invention is illustrated in FIG. 3. As compared to the prior art spring and stop assembly 80 of FIG. 2, in the improved spring and stop assembly 80' of FIG. 3, the retaining ring 202 is eliminated and a modified bolt 130' and a modified stop member 152' are provided.

The bolt 130' is formed with a threaded end portion 201' and a shank portion 203 of reduced diameter between the threaded portion 201' and a bolt head 204. The top section 153' of the stop member 152' is formed with a hole 206 which is threaded to match the threads of the end portion 201' of the bolt 130'.

The spring and stop assembly 80' is assembled by placing the lock washer 200 and the spring member 132 on the shank 203 of the bolt 130'. The end portion 201' of the bolt 130' is then threaded completely through the hole 206 in top section 153' of the stop member 152'.

To capture the thus assembled parts on the bolt 130' in accordance with the invention, adjacent end threads 207 and 208 of the threaded hole 206 and the threaded end portion 201', respectively, are then upset in a manner to prevent removal of the bolt 130' through the hole 206.

The desired upsetting of the adjacent end threads 207 and 208 is simply and effectively accomplished in accordance with the invention by applying a tension, indicated by the arrows legended T in FIG. 3, between the bolt 130' and the stop member 152'. This causes the end threads 207 and 208 to bear heavily against one another with an upsetting pressure therebetween. Simultaneous with the application of the tension T, the bolt 130' and the stop member 152' are rotated with respect to one another in a forward direction, that is, in a direction opposite to the direction required to engage the threads 207 and 208. Most conveniently, the bolt 130' is rotated as indicated by the circular arrow legended R (assuming right hand threads) while the stop member 152' is held stationary.

By performing the thread upsetting operation by the above-described process of simultaneous pressure and rotation, the adjacent threads are deformed in a rounded, smooth and polished manner which eliminates the possibility of the threads catching or snagging on one another as would be the case, for example, if only one of the threads were deformed and/or if the threads were deformed or upset in a less effective manner. With the end threads 206 and 207 thus deformed, the smooth shank portion 203 of the bolt 130' is free to turn in the hole 206 during mounting and removal of the assembly on and from the fuel bundle without danger of the spring and stop members dropping off the bolt.

Any suitable machinery can be used to perform the described thread upsetting process. For example, the well-known drill press, of suitable capacity, can be used by clamping the stop member 152' to the drill press table and securing the head of the bolt 130' in the drill press chuck. The bolt 130' is thus rotated, at a relatively low speed, by the drill press chuck while suitable pressure is applied between end threads 207 and 208 through application of a suitable upward pressure on the drill press feed lever.

Optimum tension T (and rate of applying same), speed of rotation R and the time period or number of rotations under tension are best determined by routine experimentation using a sample spring and stop assembly formed in the actual size and of the materials to be used.

As a specific example of a spring and stop assembly according to the invention: the spring member 132 is formed of Inconel X; the stop member 152' is formed of stainless steel; the retaining bolt 130', with special splined and grooved head, is formed of stainless steel with an overall length of about 2 inches, a threaded end portion (18 threads per inch) of about 0.3125 inches in diameter and a length of about 0.88 inches and a shank portion 203 of about 0.250 inches in diameter and a length of about 0.5 inches. (Other typical dimensions of a spring and stop assembly are given in the abovementioned U.S. Pat. No. Re. 27,173.) For the example spring and stop assembly, effective deformation of the adjacent threads 207 and 208 was obtained by applying a tension T of about 30–50 lbs. while rotating the bolt 130' at about 100 RPM for four or more rotations of the bolt.

What is claimed is:

1. A fuel bundle comprising a plurality of nuclear fuel elements maintained in an array by means including an upper tie plate; an upwardly extending extension of said tie plate at an upper corner of said fuel bundle, said extension having a threaded hole in its upper end; a removable elongated tubular flow channel surrounding said array of fuel elements; a corner member fixed to said channel and overlying said extension and formed with a clearance hole aligned with the hole in said extension; a stop member including a top section overlying said corner member and formed with a threaded hole aligned with the hole in said corner member; a spring member including a top section overlying said top section of said stop member and formed with a hole aligned with said threaded hole in said top section of said stop member; a bolt having a threaded portion at one end, a head of larger diameter than said threaded portion at the other end of said bolt, and a smooth shank portion of smaller diameter than said threaded portion between said threaded portion and said head, said bolt being threaded through said holes in said spring, stop and corner members and into said threaded hole in said extension whereby said spring member, said stop member and said flow channel are secured to said fuel bundle, the adjacent end threads of said threaded end portion of said bolt and in said threaded hole of said top section of said stop member being mutually deformed and upset whereby said spring member and said stop member are captured on said shank portion of said bolt.

2. The fuel bundle of claim 1 wherein said adjacent end threads are mutually deformed and upset by inserting said bolt through said holes in said top sections of said spring and said stop members and then applying a tension between said bolt and said stop member while rotating said bolt with respect to said stop member in a forward direction.

3. A spring and stop assembly for a nuclear fuel assembly comprising: a spring member including at least one leaf member and a top section having a clearance hole formed therein; a stop member including at least one side section and a top section having a threaded hole formed therein; a bolt having an enlarged head at one end, an intermediate shank portion, and a threaded end portion of larger diameter than said shank portion, the male threads on said end portion matching the female threads in said hole of said top section of said stop member, said spring member and said stop member being captured on said shank portion to prevent removal from said bolt by deformation of the adjacent end threads of said threaded end portion of said bolt and in said threaded hole of said top section of said stop member.

4. The spring and stop assembly of claim 3 wherein said adjacent end threads are deformed by applying a tension between said bolt and said stop member while causing rotation therebetween in a direction opposite to the direction of rotation required for engagement of said threads.

5. A method of assembling a spring member and a stop member on a headed retaining bolt having a threaded end portion and a smooth shank portion of diameter less than said end portion between said end portion and the head of said bolt, comprising the steps of:

1. passing said end portion of said bolt through a clearance hole in said spring member;
2. threading said end portion of said bolt through a mating threaded hole in said stop member;
3. applying a tension between said bolt and said stop member to create a pressure between the adjacent end threads of said threaded end portion of said bolt and the threaded hole of said stop member; and
4. simultaneous with said tension, causing relative rotation between said bolt and said stop member in a direction opposite to the direction of rotation required for engagement of said adjacent end threads whereby said adjacent end threads are evenly upset and deformed to prevent subsequent engagement thereof so that said spring member and said stop member are captured on said shank portion of said bolt.

* * * * *